United States Patent [19]

Chung

[11] Patent Number: 4,949,396

[45] Date of Patent: Aug. 14, 1990

[54] DIVIDER METHOD AND APPARATUS WITH MEANS FOR AVOIDING DIVIDE BY ZERO ERRORS

[75] Inventor: Kah-Seng Chung, Bull Creek, Australia

[73] Assignee: U.S. Philips Corp., New York, N.Y.

[21] Appl. No.: 261,208

[22] Filed: Oct. 21, 1988

[30] Foreign Application Priority Data

Nov. 4, 1987 [GB] United Kingdom ................ 8725870

[51] Int. Cl.[5] ................................................ H04B 1/26

[52] U.S. Cl. .................................... 455/216; 455/314; 455/303; 364/850; 307/529

[58] Field of Search ............... 455/209, 214, 315, 316, 455/337, 303-305, 137, 138, 216, 183, 264; 364/761, 764, 765, 766, 767, 582, 850; 307/529; 328/161, 160, 159, 158

[56] References Cited

U.S. PATENT DOCUMENTS

| | | | |
|---|---|---|---|
| 4,462,114 | 7/1984 | Parker | 455/214 |
| 4,677,690 | 6/1987 | Reed | 455/264 |

FOREIGN PATENT DOCUMENTS

| | | | |
|---|---|---|---|
| 2645950 | 10/1976 | Fed. Rep. of Germany | 455/209 |
| 0114330 | 3/1978 | Japan | 364/850 |
| 0244724 | 5/1969 | U.S.S.R. | 364/850 |
| 0456276 | 1/1975 | U.S.S.R. | 364/850 |

*Primary Examiner*—Douglas W. Olms
*Assistant Examiner*—Ralph Smith
*Attorney, Agent, or Firm*—Emmanuel J. Lobato

[57] ABSTRACT

A divider circuit arrangement in which in order to avoid dividing by zero the divisor ($V_d$) is modified by the addition of an extra signal ($X_a$) to form a modified divisor $V'_d = V_d + X_a$ and the dividend ($V_i$) is modified by the addition of the product of the quotient ($V_o$) and the extra signal ($X_a$) to form a modified dividend $V'_i = V_i + V_oX_a$. A particular but not exclusive application of this divider circuit arrangement is in normalizing an output signal from a dual branch receiver (not shown).

22 Claims, 3 Drawing Sheets

DIVIDER METHOD AND APPARATUS WITH MEANS FOR AVOIDING DIVIDE BY ZERO ERRORS

FIELD OF THE INVENTION

BACKGROUND OF THE INVENTION

The present invention relates to a divider circuit arrangement and particularly, but not exclusively, to a dual branch receiver having such a divider circuit arrangement.

In analogue signal processing, a division function is often used for normalising signal amplitudes. One disadvantage associated with the division function is the possibility that the resulting quotient will go to infinity if the divisor becomes zero. When this occurs, the circuit that performs this normalisation function will swing to its extreme state, for example, saturation of an analogue circuit. In practice, special precautions are usually taken to avoid this possible overflow state.

European Patent Specification No. 0075707B1 discloses a ring interferometer in which non-zero divide by zero is avoided. Light from a laser is arranged to pass through two spatially separated, partially transmitting mirrors. Two opto-electronic sensors detect light reflected by these mirrors. The outputs from these sensors are coupled to quotient forming means. In order to avoid a "divide by zero" problem an output of one of the sensors forms the dividend and the divisor is formed by the sum of proportionate parts of the signals appearing at the outputs of the sensors.

In the field of telecommunications, for example in a dual branch receiver or demodulator of a type disclosed by J. K. Goatcher, M. W. Neale and I.A.W. Vance in an article entitled "Noise considerations in an integrated circuit VHF radio receiver" in the Proceedings of the IERE Clerk Maxwell Commemorative Conference on Radio Receivers and Associated Systems (IERE Proceedings 50), University of Leeds, 7th to 9th July 1981, pages 49 to 51 a signal is normalised by it being divided using a divisor formed by the sum of the squares of the in-band components of the quadrature related signals which have been produced by mixing an input signal down to baseband. If the input signal is lost due to say a fade which may occur in a mobile environment then a divide by zero situation occurs. If such a situation should occur frequently then an inpleasant audio output may occur.

SUMMARY OF THE INVENTION

An object of the present invention is to avoid a divide by zero situation arising.

According to one aspect of the present invention there is provided a divider circuit arrangement in which in order to avoid dividing by zero the divisor is modified by the addition of an extra signal and the dividend is modified by combining it with the product of the quotient and the extra signal.

The present invention also provides a divider circuit arrangement in which a first signal is to be divided by a second signal, comprising a divider having a first input for a dividend, a second input for a divisor and an output, summing means having a first input for the second signal, a second input for an extra signal and an output for the sum of the second signal and the extra signal which forms the divisor which is applied to the second input of the divider, multiplying means having a first input connected to the output of the divider, a second input connected to receive the extra signal and an output, and signal combining means having a first input for the first signal, a second input connected to receive the product signal from the multiplying means and an output for providing the desired combination of the first signal and said product signal which combination forms the dividend and is applied to the first input of the divider.

The invention is based on the recognition of the fact that if the divisor ($V_d$) is modified by the addition of an extra signal ($X_a$) then the modified divisor ($V'_d$) will not become zero, thus $$V'_d = V_d + X_a.$$

However it is then necessary to remove the effect of the extra signal ($X_a$) from the final output ($V_o$). In accordance with the present invention this is achieved by multiplying the output ($V_o$) by the extra signal ($X_a$) and forming a combination, for example the sum of the product ($V_o.X_a$) and the dividend signal ($V_i$) to form a modified dividend ($V'_i$), thus $$V'_i = V_i + V_o X_a$$

and $$V_o = \frac{V'_i}{V'_d} = \frac{V_i + V_o X_a}{V_d + X_a} = \frac{V_i}{V_d}$$

Since this result corresponds to the original dividend being divided by the original divisor then the influence on the final output due to adding the extra term($X_a$) to the divisor ($V_d$) has now been totally removed.

The choice of $X_a$ could be either a constant value or any function which will not allow the absolute value of $V'_d$ from becoming zero. In making this choice of the added term $X_a$ account has to be taken of the nature of $V_d$, that is whether it is unipolar or bipolar. For reasons of stability and dynamic range, the value of $X_a$ should be kept to the minimum, that is, it should be a small fraction of the desired output $V_o$. If desired the value of $X_a$ could be made adaptive in response to the signal level.

In an embodiment of the present invention in which the second, divisor, signal ($V_d$) is unipolar and the extra signal has the same polarity then the output of the multiplying means comprises a negative feedback signal to the second input of the signal combining means which is operative to form the difference between the first signal and said product signal. The first input of the summing means comprises means for multiplying the second signal by $-1$ and the second input to the summing means is an inverting input for inverting the extra signal.

In another embodiment of the present invention the second signal is bipolar and signal transforming means are connected to the first input of the summing means for transforming the bipolar second signal into a unipolar signal. In one version of this embodiment the signal transforming means comprises a squaring circuit and a second multiplying means is provided which has its output connected to the first input of the signal combining means which in this embodiment functions as an adder, a first input of the second multiplying means being connected to receive the first signal and the second input of the second multiplying means being connected to receive the second signal.

In another version of this embodiment, the signal transforming means comprises a squaring circuit and a second multiplying means is provided. The second multiplying means has a first input connected to the output of the divider, a second input connected to receive the second signal and an output for the quotient of the first signal divided by the second signal.

In a further embodiment of the present invention in which the extra signal is adaptive, the divider circuit arrangement further comprises a squaring circuit coupled to the output of the divider and means for providing an output signal which comprises a substantially fixed fraction of the signal applied to its input which is coupled to an output of the squaring circuit, said output signal constituting said extra signal. Signal clamping means may be connected between the output of the signal combining means and the first input of the divider. The signal clamping means serves to limit the dynamic range of the numerator input and enable the divider to operate within its linear region thus avoiding circuit saturation and latch-up problems.

The present invention further provides a dual branch receiver comprising an input for an input signal to be demodulated, quadrature related mixing means for frequency down converting the input signal to form quadrature related first and second signals, filtering means for providing in-band components of the first and second signals, first and second multiplying means, said first multiplying means forming the product of the differential with respect to time of the in-band components of the first signal multipled by the in-band components of the second signal, said second multiplying means forming the product of the differential with respect to time of the in-band components of the second signal multipled by the in-band components of the first signal, means for substracting the output signal produced by one of the first and second multipliers from the output signal produced by the other of the first and second multipliers and signal normalising means connected to an output of the substracting means, said signal normalising means comprising the divider circuit arrangement made in accordance with the present invention, said first signal being derived from an output of the substrating means and said second signal comprising the sum of the squares of the in-band components of the first and second signals obtained from the filtering means.

If desired d.c. blocking capacitors may be provided in the signal paths from the quadrature related mixing means, for example in the output circuits of the filtering means.

BRIEF DESCRIPTION OF THE DRAWINGS

The present invention will now be described, by way of example, with reference to the accompanying drawings, wherein.

DESCRIPTION OF THE PREFERRED EMBODIMENTS

Figure 1:
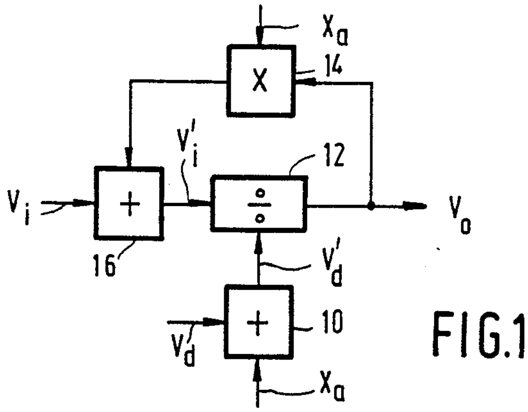
FIG. 1 is a block schematic diagram of a first embodiment of the present invention.

In the drawings corresponding features have been referenced using the same reference numerals.

In a divider or normalising circuit arrangement an input signal $V_i$ constituting the dividend is divided by another signal $V_d$ constituting the divisor to provide a quotient in the form of an output signal $V_o$. Thus $$V_o = V_i/V_d \tag{1}$$

Now if the divisor $V_d$ becomes zero, the divider circuit arrangement will saturate at its extreme state. $V_d$ can become zero if it is oscillating between positive and negative values, for example a sinusoid function, or if $V_d$ is a function of $V_i$ and $V_i$ becomes zero.

FIG. 1 illustrates one embodiment of a divider circuit arrangement in which measures are taken to avoid $V_d$ becoming zero. In essence an extra signal $X_a$ is added to $V_d$ in a summing circuit 10 to form a modified divisor $V'_d$ which is applied to a divider 12. Thus $$V'_d = V_d + X_a \tag{2}$$

The choice of $X_a$ could be either a constant value or any function which will not allow the absolute value of $V'_d$ to become zero.

Having provided a modified divisor $V'_d$ it is also necessary to remove the effect of the extra signal $X_a$ from the final output $V_o$ of the illustrated divider circuit arrangement. In the illustrated embodiment the output $V_o$ is fed back to a multiplier circuit 14 in which it is multiplied by the extra signal $X_a$ and the product $V_oX_a$ is combined, in this embodiment added, with the input signal $V_i$ in a signal combining circuit 16 to form a modified dividend $V'_i$ where $$V'_i = V_i + V_oX_a \tag{3}$$

$$\text{The quotient } V_o = V'_i/V'_d \tag{4}$$

Substituting equations (2) and (3) into equation (4) yields $$V_o = \frac{V_i + V_oX_a}{V_d + X_a} = V_i/V_d \tag{5}$$

As equation (5) gives exactly the same result as equation (1), then it confirms that the influence on the final output due to adding the extra signal $X_a$ to the divisor $V_d$ has now been totally removed, whilst at the same time a divide-by-zero problem has been avoided.

Subject to the foregoing comments on the choice of the extra signal $X_a$, another factor to be taken into account is the nature of $V_d$, that is whether it is unipolar or bipolar. Additionally for practical purposes of stability and dynamic range, the value of $X_a$ should be kept to the minimum, that is, it should be a small fraction of the desired output, $V_o$. The value of $X_a$ can be made adapative in response to the signal level and an adaptive embodiment will be described later with reference to FIG. 5 of the accompanying drawings.

If the divisor $V_d$ is unipolar, that is, $V_d \geqq 0$ or $V_d \leqq 0$ then a non-zero positive $X_a$ should be adopted when $V_d \geqq 0$ and a non-negative $X_a$ is adopted for $V_d \leqq 0$.

Figure 2:
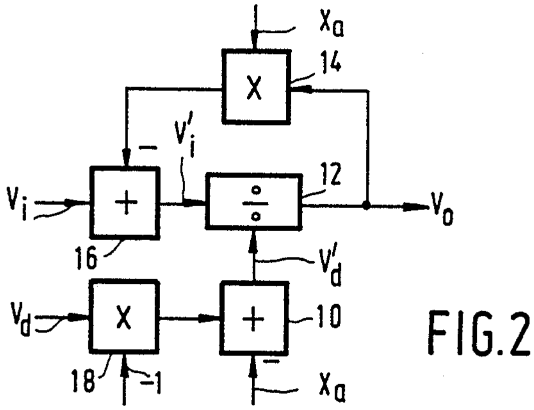
FIG. 2 is a block schematic diagram of a second embodiment of the present invention having a unipolar divisor.

FIG. 1 shows the feedback term being added to the input signal $V_i$ in the signal combining circuit 16 for $V_d \geqq 0$. When a negative feedback term is desirable then this can be done using the embodiment shown in FIG. 2. The signal combining stage 16 forms the difference between $V_i$ and the negatively fed back signal $V_oX_a$. In the case of a positive going divisor $V_d$ then its polarity is changed by multiplying by $-1$ in a multiplying circuit 18 and it is added to $-X_a$ in the summing circuit 10 so that $V'_d = -(V_d + X_a)$. The remainder of this embodiment is the same as described with reference to FIG. 1. The desirable output is now given by $$V_o = \frac{V_i - V_oX_a}{-(V_d + X_a)} = -\frac{V_i}{V_d} \quad (6)$$

where $V_d \geqq 0$ and $X_a$ is non-zero and positive.

Figure 3:
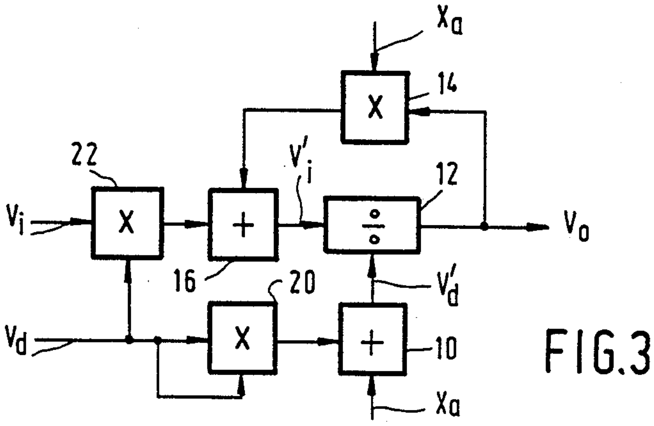
FIGS. 3 and 4 are block schematic diagrams of third and fourth embodiments of the present invention having a bipolar divisor.
Figure 4:
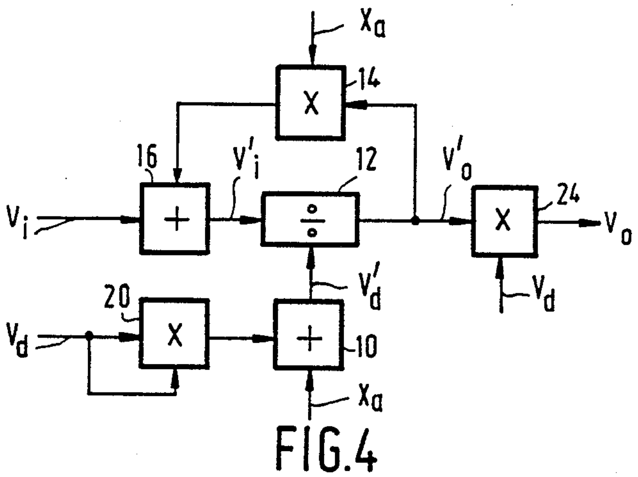

FIGS. 3 and 4 are embodiments in which the divisor $V_d$ is bipolar or oscillatory and can go to zero. In order to keep $X_a$ small, an option such as $X_a$ being constant and having an absolute value greater than the absolute peak value of $V_d$ is not viable. The embodiments of FIGS. 3 and 4 avoid the problem of a bipolar $V_d$ by transforming it into a unipolar signal by squaring the bipolar $V_d$ in a multiplier 20. The squared value of $V_d$, that is $V_d^2$, is added to the extra signal $X_a$ in the summing circuit 10 to form a modified divisor $$V'_d = V_d^2 + X_a.$$

In FIG. 3 the influence of the squaring of $V_d$ on the final output $V_o$ is cancelled by multiplying $V_i$ with $V_d$ using a multiplying circuit 22 and the product is added to $V_oX_a$ in the signal combining circuit 16. The final output $V_o$ is given by $$V_o = \frac{V_iV_d + V_oX_a}{V_d^2 + X_a} = \frac{V_i}{V_d} \quad (7)$$

The alternative technique shown in FIG. 4 for avoiding the influence of squaring $V_d$ is to produce an intermediate output $V'_o$ and multiply it by $V_d$ in a multiplying circuit so that the final output becomes $$V_o = V'_o \times V_d = \frac{V_i}{V_d^2} \times V_d = \frac{V_i}{V_d} \quad (8)$$

Figure 5:
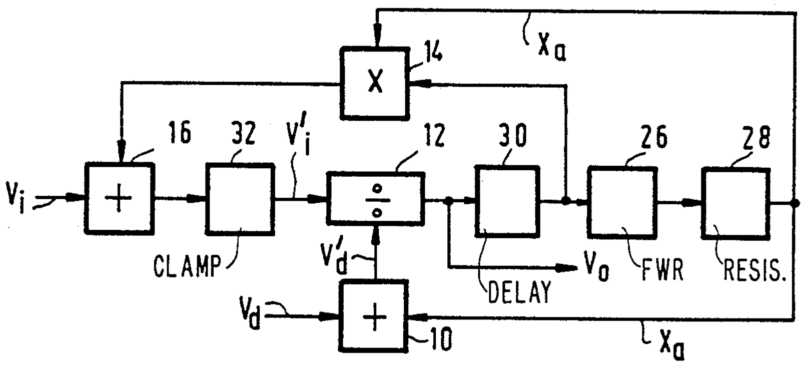
FIG. 5 is a block schematic diagram of a fifth embodiment of the present invention in which the extra signal ($X_a$) is made adaptive.

FIG. 5 is an adaptive embodiment of the divider circuit arrangement in which the extra signal $X_a$ is a function of the desired output $V_o$ and is given by $$X_a = |V_o| \times KFB$$

where KFB is a gain constant.

In order to obtain a unipolar signal $|V_o|$ the output is applied to a full wave rectifier 26. The resultant signal is multiplied by the gain constant KFB produced by a circuit 28 which can be implemented as a resistive attenuation network. A delay network 30 is provided between the output $V_o$ and the full wave rectifier 26 to compensate for signal propagation delays. However the delay network 30 may not be needed if the signal propagation delay introduced by the circuits in the feedback loop formed by circuits 26, 28 and 14 are sufficient.

The modified dividend signal $V'_i$ is given by $$V'_i = V_i + V_oX_a.$$

A clamping circuit 32 is connected between the signal combining circuit 16 and the divider 12 to limit the value of $V'_i$ within a range $-A$ to $+A$. By limiting the dynamic range of the modified dividend $V'_i$, the maximum allowable output signal value $V_o$ and input signal value $V_i$ are, respectively, given as follows:

$$V_{o\,max} = \frac{|A|}{V_d + KFBx|V_o|} \leqq \sqrt{\frac{|A|}{KFB}} \quad (10)$$

The maximum value of $V_o$ occurs when $V_d$ is zero.

$$V_{i\,max} \leqq |A| - KFBx|V_o| = |A| - \sqrt{KFBxA} \quad (11)$$

From equations (10) and (11), it can be observed that the maximum values of $V_i$ and $V_o$ are governed by the values of input clamping level A and the feedback factor KFB. By a proper choice of these two values the divider 12 will operate within its linear region, thus avoiding circuit saturation and latch up problems. If a very small feedback factor KFB, for example 0.01 is adopted, then the reduction in dynamic range of $V_i$ will be minimal.

Figure 6:
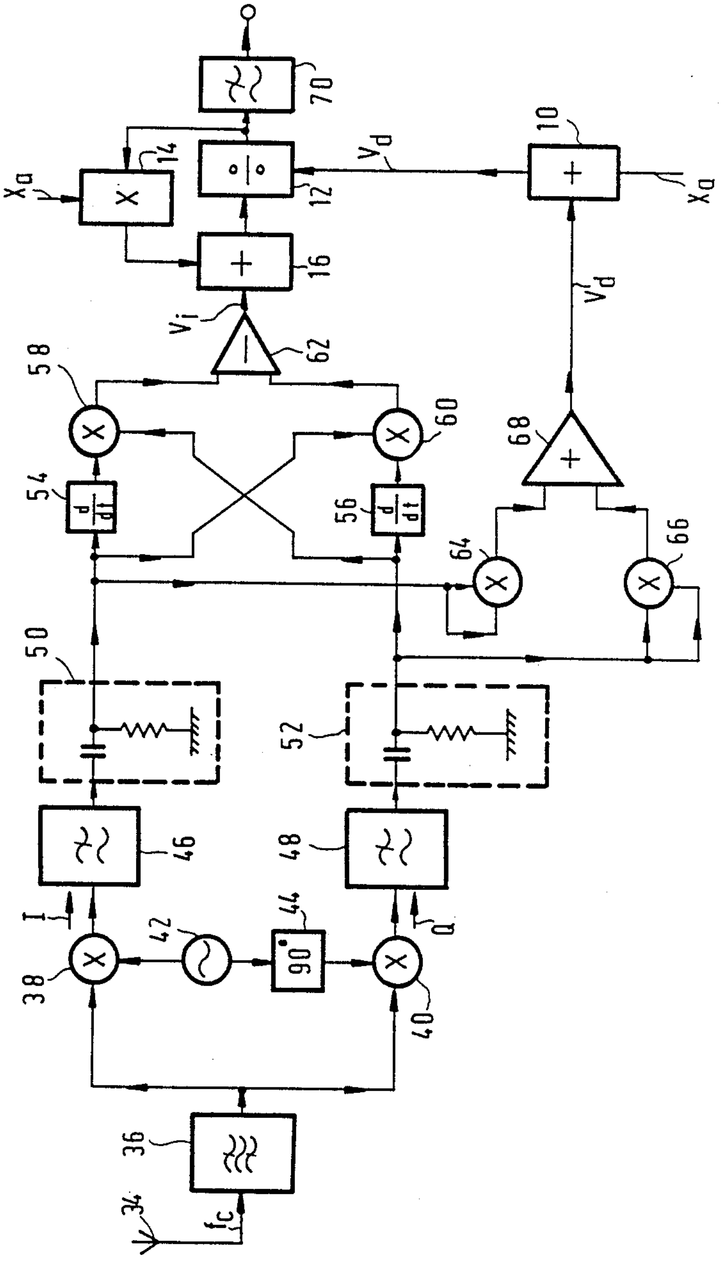
FIG. 6 is a block schematic diagram of an embodiment of a dual branch receiver having a divider circuit arrangement made in accordance with the present invention.

The divider circuit arrangements shown in FIGS. 1 to 5, can be used in any suitable desired practical application. One example is illustrated in FIG. 6 which shows a dual branch radio receiver in which a demodulated signal is normalised using a divider circuit arrangement made in accordance with the present invention.

The illustrated receiver circuit is in many respects known in the art, for example the article "Noise considerations in an integrated circuit VHF radio receiver" by J. K. Goatcher, M. W. Neale and I.A.W. Vance referred to in detail in the preamble.

For the sake of completeness the circuit will be described briefly. An incoming signal angle modulated on a nominal carrier frequency $f_c$ is received by an antenna 34 and is coupled by way of a band-pass anti-harmonic filter 36 to inputs of first and second quadrature related mixers 40. A local oscillator 42 of substantially the same frequency as the carrier frequency $f_c$ is applied to the mixer 38 and via a 90° phase shifter 44 is applied to the mixer 40. The outputs from the mixers 38, 40 respectively comprise in-phase signal components I and quadrature phase signal components Q at baseband frequencies. Low pass filters 46, 48 pass the in-band signal components of the I and Q signals, respectively. D.C. blocking filters 50, 52 are connected to the filters 46, 48 in order to eliminate the d.c. offsets in the filtered I and Q signals, which offsets may exceed the amplitude of the wanted signal.

The in-band components of the I and Q signals from the blocking filters are differentiated with respect to time in differentiating circuits 54, 56 and are applied to respective first inputs of mixers 58, 60. These I and Q signals are applied to second inputs of the mixers 60, 58, respectively. An output of one of the mixers 58, 60 is subtracted from the output of the other of the mixers 58, 60 in a subtracting stage 62. As is known the signal at the output of the subtracting stage 62 has a square-law dependence on the level of the input signal. In order to remove this dependence, the signal at the output of the subtracting stage 62 is normalised using an amplitude divider. The divisor is obtained by summing the squares of the I and Q signals using multipliers 64, 66 and summing stage 68. In a situation of a zero input signal due to say a fade then the divisor will become zero leading to saturation and latching-up in the divider. This problem is resolved by providing the divider circuit arrangement made in accordance with the present invention and connecting the arrangement so that its input signal $V_i$ is the output of the subtracting stage and $V_d$ is the sum of the squares of the I and Q signals at the output of the summing stage 68. By avoiding the risk of dividing by zero then the likelihood of an unpleasant audio output being produced is slight. The demodulated signal is obtained from the output of a low pass filter 70 connected to the divider 12.

The divider circuit arrangements illustrated in FIGS. 2 to 5 can be used in place of the arrangement illustrated which is essentially that of FIG. 1.

What is claimed is:

1. A divider circuit arrangement in which a first signal is to be divided by a second signal and in which an extra signal is used to produce a dividend signal and a divisor signal comprising:
- divider means for dividing the dividend signal by the divisor signal to produce a divider output signal and having a first input for the dividend signal, a second input for the divisor signal and an output;
- summing means for adding the second signal to the extra signal to produce the divisor signal and having a first input for receiving the second signal, a second input for receiving the extra signal and an output connected to apply the divisor signal to the second input of the divider means;
- multiplying means for multiplying the divider output signal by the extra signal to produce a product signal and having a first input connected to the output of the divider means, a second input for receiving the extra signal and an output for the product signal; and
- signal combining means having a first input for receiving the first signal, a second input connected to receive the product signal from the multiplying means, and an output for providing a desired combination of the first signal and said product signal which combination forms the dividend and is applied to the first input of the divider means.

2. The apparatus of claim 1, wherein the second signal is unipolar, and further comprising means for adjusting the polarity of the extra signal to have the same polarity as the unipolar second signal.

3. The apparatus of claim 2 further comprising:
- means for providing the output of the multiplying means as a negative feedback signal to the second input of the signal combining means which is operative to form the difference between the first signal and the product signal;
- second multiplying means for multiplying the second signal by −1 to produce an inverted input and having a first input connected to receive the second signal, a second input connected to receive a signal equivalent to negative one, and an output for the inverted second signal connected to the first input of the first summing means; and
- inverting means located at the second input to the first summing means for making the second input an inverted input.

4. The apparatus of claim 1, wherein the second signal is bipolar, further comprising:
- signal transforming means for transforming the bipolar second signal into a unipolar signal and having an input for the bipolar second signal and an output connected to the first input of the first summing means.

5. The apparatus of claim 4 further comprising:
- squaring means constituting said transforming means; and
- second multiplying means for multiplying the first signal by the second signal and having a first input connected to receive the first signal, a second input connected to receive the second signal, and an output connected to the first input of the signal combining means.

6. The apparatus of claim 4 further comprising:
- squaring means constituting said transforming means; and
- second multiplying means for multiplying the divider output signal by the second signal to produce a quotient signal and having a first input connected to the output of the divider means, a second input connected to receive the second signal and an output for the quotient signal.

7. The apparatus of claim 1 further comprising:
- adapting means for generating the extra signal so that said extra signal is a fraction of the divider output signal.

8. The apparatus of claim 7, wherein the second signal is unipolar, further comprising:
- squaring means for squaring the divider output signal and having an input connected to the output of the divider and an output; and
- fractionalizing means for taking the output of the squaring means and providing an output signal which comprises a substantially fixed fraction of the output of the squaring means and having an input connected to the output of the squaring means and an output, said output signal constituting the extra signal.

9. The apparatus of claim 8 further comprising:
- signal clamping means connected between the output of the signal combining means and the first input of the divider means.

10. A dual branch receiver comprising:
- input means for an input signal which is to be demodulated;
- quadrature related mixing means for frequency down converting of the input signal to form a quadrature related first signal and a quadrature related second signal, said quadrature related mixing means having the input signal as an input, a first output for the quadrature related first signal, and a second output for the quadrature related second signal;

first filtering means for providing the in-band components of the quadrature related first signal and having an input connected to the first output of the quadrature related mixing means and an output;

second filtering means for providing the in-band components of the quadrature related second signal having an input connected to the second output of the quadrature related mixing means and an output;

first differentiating means for forming the differential with respect to time of the in-band components of the quadrature related first signal having an input connected to the output of the first filtering means and an output;

second differentiating means for forming the differential with respect to time of the in-band components of the quadrature related second signal having an input connected to the output of the second filtering means and an output;

first multiplying means for forming the product of the differential with respect to time of the in-band components of the quadrature related first signal multiplied by the in-band components of the quadrature related second and having a first input connected to the output of the first differentiating means, a second input connected to the output of the second filtering means, and an output;

second multiplying means for forming the product of the differential with respect to time of the in-band components of the quadrature related second signal multiplied by the in-band components of the quadrature related first signal and having a first input connected to the output of the second differentiating means, a second input connected to the output of the first filtering means, and an output;

subtracting means for producing a difference signal corresponding to the difference of the outputs of the first and second multiplying means and having a first input connected to the output of the first multiplying means, a second input connected to the output of the second multiplying means, and an output for the difference signal;

first signal squaring means for squaring the in-band components of the quadrature related first signal having an input connected to the output of the first filtering means and an output;

second signal squaring means for squaring the in-band components of the quadrature related second signal having an input connected to the output of the second filtering means and an output;

receiver summing means for adding the outputs of the first and second signal squaring means to produce a summation signal, having a first input connected to the output of the first signal squaring means, a second input connected to the output of the second signal squaring means, and an output for the summation signal; and signal normalizing means comprising a divider circuit arrangement for dividing the difference signal by the summation signal having a first input for the difference signal connected to the output of the substracting means, an input for the summation signal connected to the output of the receiver summing means and an output for a divider output signal, whereby the summation signal is modified by the addition of an extra signal and the difference signal is modified by the addition of a modified divider output signal so that the resulting divider output signal actually represents the difference signal divided by the summation signal while avoiding divide by zero errors.

11. The apparatus of claim 10 further comprising:

first D.C. blocking capacitor means in the signal path from the quadrature related mixing means of the quadrature related first signal; and second D.C. blocking capacitor means in the signal path from the quadrature related mixing means of the quadrature related second signal.

12. The apparatus of claim 11, wherein the first D.C. blocking capacitor means is provided in an output circuit of the first filtering means; and the second D.C. blocking capacitor means is contained in an output circuit of the second filtering means.

13. The apparatus of claim 10 wherein the divider circuit arrangement further comprises:

divider means to divide a dividend signal by a divisor signal to produce the divider output signal having a first input for the dividend signal and a second input for the divisor signal and an output;

third multiplier means for multiplying the divider output signal by an extra signal to produce a product signal having a first input connected to the output of the divider means, a second input connected to receive the extra signal, and an output;

signal combining means for combining the first signal with the product signal to produce the dividend signal having a first input connected to the output of the multiplier means, a second input connected to receive the first signal, and an output connected to the first input of the divider means; and summing means for adding the second signal to the extra signal to produce the divisor signal having a first input connected to receive the second signal, a second input connected to receive the extra signal, and an output connected to the second input of the divider means.

14. The apparatus of claim 13, wherein the second signal is unipolar, further comprising polarity arranging means for adjusting the polarity of the extra signal to have the same polarity as the unipolar second signal.

15. The apparatus of claim 14 further comprising:

means for providing the output of the third multiplier means as a negative feedback signal to the second input of said signal combining means which operates to form the difference between the first signal and the product signal;

fourth multiplier means for multiplying the second signal by $-1$ having a first input connected to receive the second signal, a second input for receiving a signal equivalent to negative one, and an output connected to the first input of the summing means; and inverting means located at the second input to the summing means for making the second input an inverting input.

16. The apparatus of claim 13, wherein the second signal is bipolar, further comprising:

signal transforming means for transforming the bipolar second signal into a unipolar signal connected to the first input of the summing means.

17. The apparatus of claim 16 further comprising:

third squaring means constituting said transforming means; and fourth multiplying means for multiplying the first signal by the second signal having a first input connected to receive the first signal, a second input connected to receive the second signal, and an output connected to the first input of the signal combining means.

18. The apparatus of claim 16 further comprising:

third squaring means constituting said transforming means; and fourth multiplier means for multiplying the divider output signal by the second signal to produce a quotient signal having a first input connected to the output of the divider means, a second input connected to receive the second signal, and an output.

19. The apparatus of claim 13 further comprising:

adapting means for generating the extra signal so that said extra signal is a fraction of the divider output signal.

20. The apparatus of claim 19, wherein the second signal is unipolar, further comprising:

third squaring means for squaring the divider output signal having an input connected to the output of the divider means and an output; and fractionalizing means for taking the output of the third squaring means and providing an output signal which comprises a substantially fixed fraction of the output of the third squaring means having an input connected to the output of the third squaring means and an output, said output signal comprising the extra signal.

21. The apparatus of claim 19 further comprising:

signal clamping means connected between the output of the signal combining means and the first input of the divider means.

22. A method for dividing a first signal by a second signal to produce a quotient signal and for using an extra signal, comprising:

adding said second signal to said extra signal to produce a modified second signal;

multiplying said quotient signal by said extra signal to produce a product signal;

adding said product signal to said first signal to produce a modified first signal; and dividing said modified first signal by said modified second signal to produce the quotient signal, whereby the method divides the first signal by the second signal but avoids dividing by zero.

* * * * *